(12) United States Patent
Liu et al.

(10) Patent No.: US 10,335,754 B2
(45) Date of Patent: *Jul. 2, 2019

(54) NOZZLE FOR PRODUCING MICROPARTICLES

(71) Applicant: METAL INDUSTRIES RESEARCH & DEVELOPMENT CENTRE, Kaohsiung (TW)

(72) Inventors: Zong-Hsin Liu, Kaohsiung (TW); Cheng-Han Hung, Kaohsiung (TW); Ying-Chieh Lin, Kaohsiung (TW); Cheng-Tang Pan, Kaohsiung (TW); Yao-Kun Huang, Kaohsiung (TW); Ying-Cheng Lu, Kaohsiung (TW)

(73) Assignee: Metal Industries Research & Development Centre, Kaohsiung (TW)

(*) Notice: Subject to any disclaimer, the term of this patent is extended or adjusted under 35 U.S.C. 154(b) by 32 days.

This patent is subject to a terminal disclaimer.

(21) Appl. No.: 15/379,722

(22) Filed: Dec. 15, 2016

(65) Prior Publication Data

US 2018/0111103 A1 Apr. 26, 2018

(30) Foreign Application Priority Data

Oct. 26, 2016 (TW) .............................. 105134610 A (51) Int. Cl.
*B01J 2/04* (2006.01)
*B01J 2/06* (2006.01)
*B05B 1/00* (2006.01)

(52) U.S. Cl.
CPC .. *B01J 2/06* (2013.01); *B05B 1/00* (2013.01)

(58) Field of Classification Search
CPC ...................................................... B01J 2/06

USPC ....................................................... 425/6–10
See application file for complete search history.

(56) References Cited

U.S. PATENT DOCUMENTS 8,012,663 B2 * 9/2011 Norikane .................... B01J 2/04
430/137.19
8,568,628 B2 * 10/2013 Norikane .................... B01J 2/04
425/6

OTHER PUBLICATIONS

Robert J. Lang, Ultrasonic Atomization of Liquids, The Journal of the Acoustical Society of America, Jan. 1962, 3 pages, vol. 34, No. 1, United States.

* cited by examiner

*Primary Examiner* — Joseph S Del Sole
*Assistant Examiner* — Thu Khanh T Nguyen
(74) *Attorney, Agent, or Firm* — Alan D. Kamrath; Kamrath IP Lawfirm, P.A.

(57) ABSTRACT

A nozzle for producing microparticles includes a nozzle body having an oscillating device and an amplifying portion connected to the oscillating device and located between first and second ends of the nozzle body. A through-hole extends from the first end through the amplifying portion and the second end. A tube assembly is mounted in the through-hole and includes first and second tubes between which a first fluid passageway is defined. A second fluid passageway is defined in the second tube. Two ends of the first tube respectively form a first filling port and a plurality of first outlet ports both of which intercommunicate with the first fluid passageway. Two ends of the second tube respectively form a second filling port and a second outlet port both of which intercommunicate with the second fluid passageway. A formation space is defined between the second outlet port and the first outlet ports.

5 Claims, 6 Drawing Sheets

NOZZLE FOR PRODUCING MICROPARTICLES

CROSS REFERENCE TO RELATED APPLICATIONS

The application claims the benefit of Taiwan application serial No. 105134610, filed Oct. 26, 2016, the subject matter of which is incorporated herein by reference.

BACKGROUND

1. Technical Field

The present disclosure relates to a nozzle for producing microparticles and, more particularly, to a nozzle for mass production of microparticles.

2. Description of the Related Art

Microparticles, also known as microspheres, are spherical particles having a diameter ranging from 1 µm to 1000 µm, are generally used as microcarriers for releasing drugs, and have become one of the emerging drug delivery technologies due to the characteristics of targeting, controlled release, stability, and surface modifiability.

Since the diameters of microparticles are small, the first aim is to form microparticles of uniform diameters to make each microparticle have the same drug releasing effect. For example, a conventional micro fluid passageway structure 9 shown in FIG. 1 can be used to form microparticles with more uniform diameters.

Figure 1:
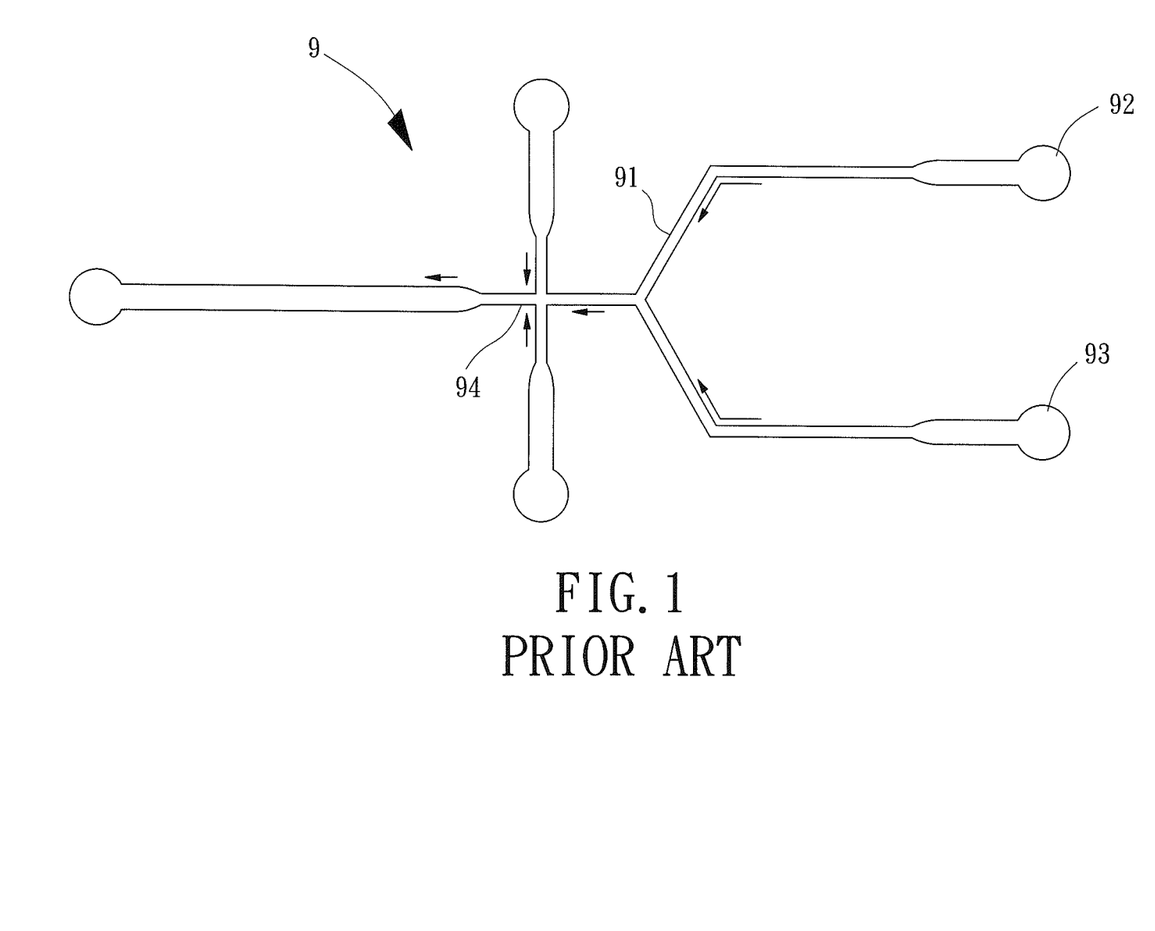

With reference to FIG. 1, the conventional micro fluid passageway structure 9 includes a Y-shaped passageway 91, a curing agent filling port 92, a material solution filling port 93, and a cruciform micro fluid passageway 94. The Y-shaped passageway 91 is intercommunicated with the cruciform micro fluid passageway 94. A branch of the Y-shaped passageway 91 is intercommunicated with the curing agent filling port 92 through which a curing agent solution is filled. Another branch of the Y-shaped passageway 91 is intercommunicated with the material solution filling port 93 through which a material solution is filled. The curing agent solution and the material solution form a pre-solidified mixed solution at a third end of the Y-shaped passageway 91. The third end of the Y-shaped passageway 91 is intercommunicated with the cruciform micro fluid passageway 94. A water phase solution is filled through two ends of the cruciform micro fluid passageway 94. The shear stress of the water phase solution filled into the cruciform micro fluid passageway 94 makes the pre-solidified mixed solution flowing into the cruciform micro fluid passageway 94 form emulsified spheres separate from each other, and each emulsified sphere finally forms a microparticle.

Although the above conventional micro fluid passageway structure 9 can form microparticles with more uniform diameters, the conventional micro fluid passageway structure 9 cannot easily proceed with mass production. Improvement is, thus, necessary.

SUMMARY

To solve the above problem, the present disclosure provides a nozzle enabling mass production of microparticles.

A nozzle for producing microparticles according to the present disclosure includes a nozzle body and a tube assembly. The nozzle body includes a first end and a second end opposite to the first end. The nozzle body further includes a through-hole, an oscillating device, and an amplifying portion. The oscillating device is connected to the amplifying portion. The amplifying portion is located between the first end and the second end. The through-hole extends from the first end of the nozzle body through the amplifying portion and extends through the second end of the nozzle body. The tube assembly is mounted in the through-hole and includes a first tube and a second tube surrounded by the first tube. A first fluid passageway is defined between the first tube and the second tube. A second fluid passageway is defined in the second tube. The first fluid passageway and the second fluid passageway are configured to respectively permit two fluids to flow from the first end toward the second end of the nozzle body. The first tube includes a first end forming a first filling port intercommunicated with the first fluid passageway and a second end forming a plurality of first outlet ports intercommunicated with the first fluid passageway. The second tube includes a first end forming a second filling port intercommunicated with the second fluid passageway and a second end forming a second outlet port intercommunicated with the second fluid passageway. A formation space is defined between the second outlet port and the plurality of first outlet ports. By the design of the tube assembly having the first tube and the second tube, a dual-layer liquid film is formed on each first outlet port. Furthermore, by using the vibrational energy generated by the combined action of the piezoelectric portion and the amplifying portion, the thickness of the dual-layer liquid film on each first outlet port is reduced, thereby forming dual-layer microdroplets that fall into the tank. Thus, the present disclosure achieves the effect of mass production of microparticles of a uniform size. In an example, each of the plurality of outlet ports has a diameter, with two adjacent outlet ports having a wall spacing therebetween, and the wall spacing is at least two times the diameter. Thus, the liquid films on the first outlet ports can more easily absorb the vibrational energy generated by the piezoelectric portion and the amplifying portion to form a standing wave.

In an example, the first tube includes an end formed by a sleeve having the plurality of first outlet ports. Thus, a worker can replace the sleeve according to needs to improve use convenience. Furthermore, it is not necessary to replace the whole nozzle, thereby reducing the purchasing costs of the nozzle.

In an example, the oscillating device includes a piezoelectric portion. The through-hole extends from the first end of the nozzle body through the piezoelectric portion and the amplifying portion in sequence and extends through the second end of the nozzle body. Thus, the contact area between the piezoelectric portion and the amplifying portion can be increased to effectively transmit the vibrational energy to the amplifying portion.

The present disclosure will become clearer in light of the following detailed description of illustrative embodiments of the present disclosure described in connection with the drawings.

BRIEF DESCRIPTION OF THE DRAWINGS

FIG. 1 is a diagrammatic view of a conventional micro fluid passageway structure.

FIG. 2 is an exploded, partly cut-away, perspective view of a nozzle for producing microparticles of an embodiment according to the present disclosure.

FIG. 3 is a cross sectional view of the nozzle of FIG. 2.

FIG. 4 is an enlarged view of a portion of FIG. 3.

FIG. 5 is a diagrammatic view illustrating use of the nozzle of FIG. 2.

DETAILED DESCRIPTION

Figure 2:
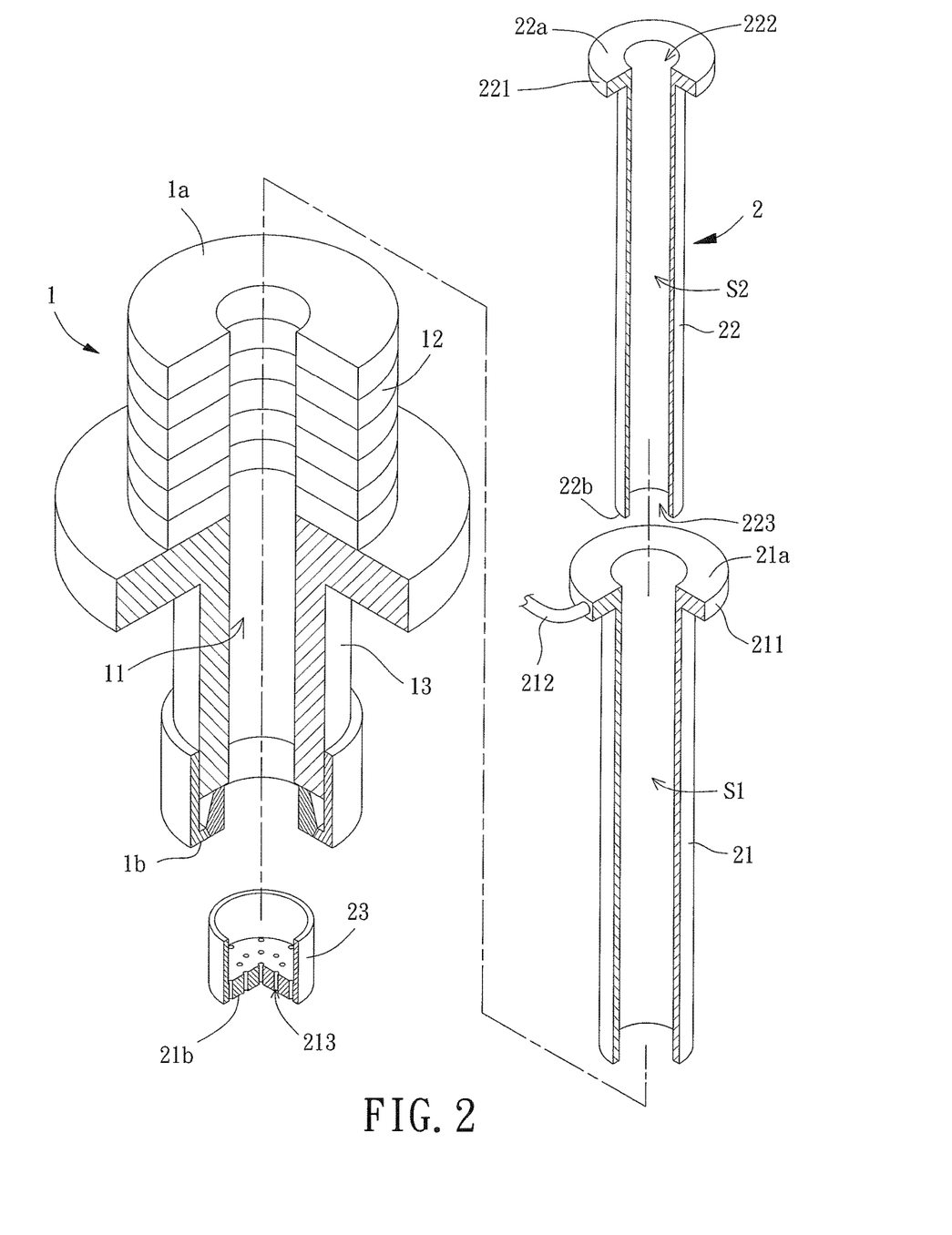
Figure 3:
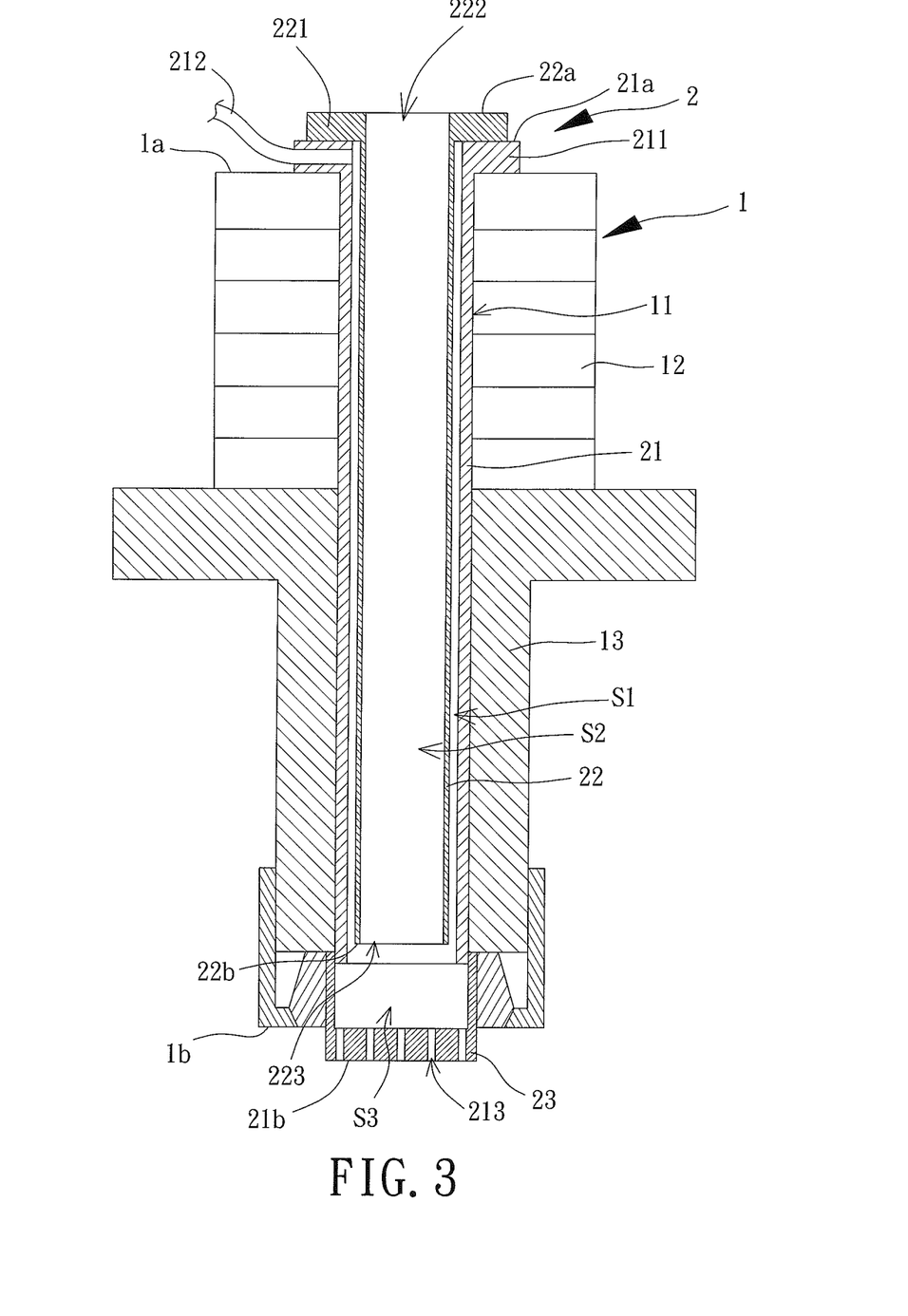

With reference to FIGS. 2 and 3, a nozzle for producing microparticles of an embodiment according to the present disclosure includes a nozzle body 1 and a tube assembly 2. The nozzle body 1 includes a through-hole 11. The tube assembly 2 is mounted in the through-hole 11.

Specifically, the nozzle body 1 has a first end 1a and a second end 1b opposite to the first end 1a. The nozzle body 1 further includes an oscillating device and an amplifying portion 13. The oscillating device can be directly or indirectly connected to the amplifying portion 13. The amplifying portion 13 is located between the first end 1a and the second end 1b. The through-hole 11 extends from the first end 1a through the amplifying portion 13 and extends through the second end 1b. In this embodiment, the oscillating device includes a piezoelectric portion 12. When the piezoelectric portion 12 receives high frequency electric energy from a supersonic wave generator G (see FIG. 5), the high frequency electric energy is turned into vibrational energy which is transmitted to the amplifying portion 13, such that the second end 1b of the nozzle body 1 can have the maximum vibrational amplitude. In this embodiment, the piezoelectric portion 12 is directly connected to the amplifying portion 13, and the through-hole 11 extends from the first end 1a through the piezoelectric portion 12 and the amplifying portion 13 in sequence and extends through the second end 1b. Thus, the contact area between the piezoelectric portion 12 and the amplifying portion 13 can be increased to effectively transmit the vibrational energy to the amplifying portion 13.

With reference to FIGS. 2 and 3, a first fluid passageway S1 and a second fluid passageway S2 are defined in the tube assembly 2. In this embodiment, the tube assembly 2 includes a first tube 21 and a second tube 22 surrounded by the first tube 21. The first fluid passageway S1 is defined between the first tube 21 and the second tube 22. The second fluid passageway S2 is defined in the second tube 22.

The first tube 21 can be coupled to the through-hole 11 of the nozzle body 1 by the outer periphery of the first tube 21. For example, the outer diameter of the first tube 21 can be slightly larger than or equal to the diameter of the through-hole 11, such that the first tube 21 can be coupled in the through-hole 11 of the nozzle body 1 by tight coupling. In another example, as shown in FIGS. 2 and 3, the first tube 21 has a first end 21a and a second end 21b opposite to the first end 21a. The first end 21a of the first tube 21 includes a first positioning portion 211 having a maximum outer diameter larger than the diameter of the through-hole 11. Thus, the first tube 21 can be positioned in a predetermined position by the first positioning portion 211.

Furthermore, a first filling port 212 is defined in the first end 21a of the first tube 21, and a plurality of first outlet ports 213 is defined in the second end 21b of the first tube 21. The first filling port 212 and the first outlet ports 213 are intercommunicated with the first fluid passageway S1 to permit a first fluid F1 to flow from the first end 1a toward the second end 1b of the nozzle body 1 (see FIG. 5). In this embodiment, the second end 21b of the first tube 21 is formed by a sleeve 23. The sleeve 23 includes the first outlet ports 213. Thus, a worker can replace the tube assembly 2 or the sleeve 23 according to different needs to improve use convenience. Furthermore, it is not necessary to replace the whole nozzle, thereby reducing the purchasing costs of the nozzle.

Thus, a worker can fill the first fluid F1 into the first filling port 212 at a first speed v1 (see FIG. 5), such that the first fluid F1 flows through the first fluid passageway S1 and forms a liquid film on each first outlet port 213 by surface tension. Furthermore, the liquid film on each first outlet port 213 can absorb the vibrational energy generated by the combined action of the piezoelectric portion 12 and the amplifying portion 13 to form a standing wave, thereby reducing the thickness of the liquid film. As a result, each liquid film can exit the corresponding first outlet port 213 in the form of a uniform and tiny spray.

Figure 4:
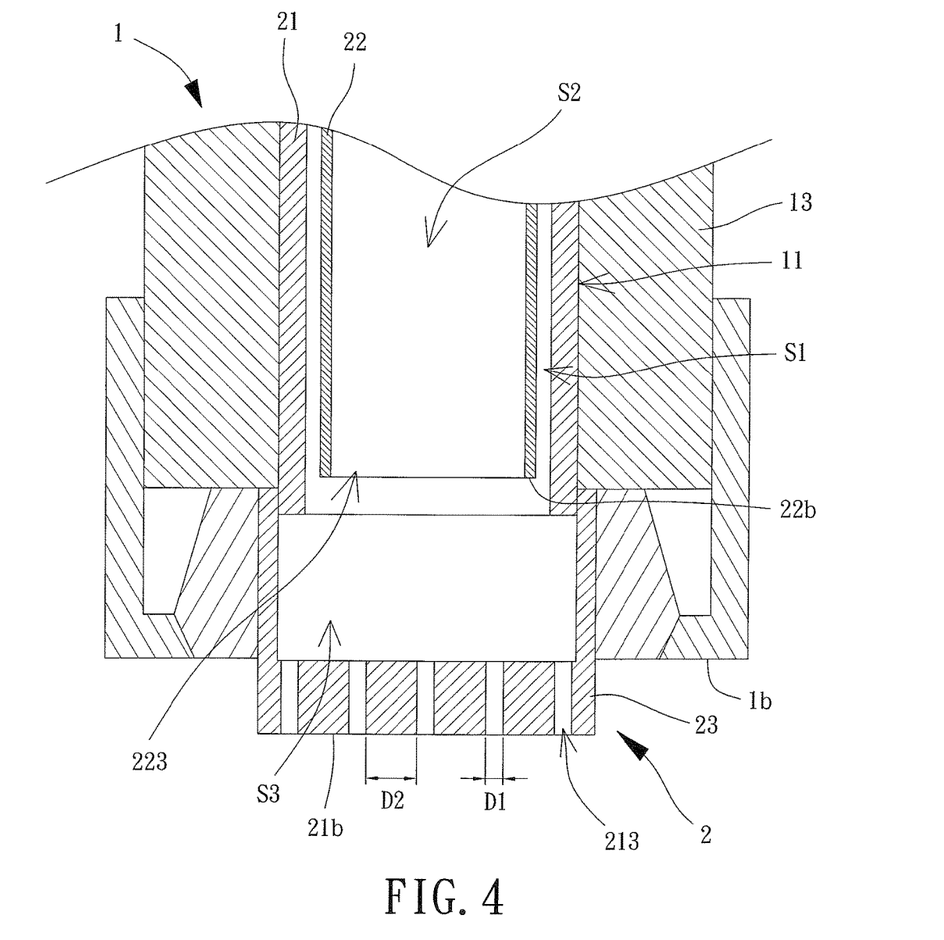

With reference to FIG. 4, each first outlet port 213 has a diameter D1. Two adjacent first outlet ports 213 have a wall spacing D2 therebetween. The wall spacing D2 is preferably at least two times the diameter D1. Thus, the liquid film on each first outlet port 213 can more easily absorb the vibrational energy generated by the piezoelectric portion 12 and the amplifying portion 13 to form a standing wave.

With reference to FIGS. 2 and 3, the second tube 22 includes a first end 22a and a second end 22b opposite to the first end 22a. The first end 22a of the second tube 22 has a second positioning portion 221 coupled with the first positioning portion 211 of the first tube 21 to position the second tube 22 in a predetermined position.

The first end 22a and the second end 22b of the second tube 22 form a second filling port 222 and a second outlet port 223, respectively. The second filling port 222 and the second outlet port 223 are intercommunicated with the second fluid passageway S2, such that a second fluid F2 can flow from the first end 1a toward the second end 1b of the nozzle body 1 (see FIG. 5). Thus, the worker can fill the second fluid F2 (see FIG. 5) into the second filling port 222 at a second speed v2, and the second fluid F2 flows through the second fluid passageway S2 and forms a liquid film on the second outlet port 223 by surface tension.

With reference to FIG. 3, it is noted that in order to make the second fluid F2 form a complete liquid film on the second outlet port 223 and make the first fluid F1 envelop the liquid film formed by the second fluid F2, a formation space S3 is preferably defined between the second outlet port 223 of the second tube 22 and the first outlet ports 213 of the first tube 21. The formation space S3 is intercommunicated with the second outlet port 223 of the second tube 22 and the first outlet ports 213 of the first tube 21.

Furthermore, each of the first tube 21 and the second tube 22 can be formed by a material capable of resisting adhesion of the first fluid F1 and the second fluid F2. Alternatively, a coating capable of resisting adhesion of the first fluid F1 and the second fluid F2 can be coated on an inner periphery of the first tube 21 and an inner periphery of the second tube 22 to increase flow smoothness of the first fluid F1 and the second fluid F2 in the first fluid passageway S1 and the second fluid passageway S2. Furthermore, the flow rate and pressure of the first and second fluids F1 and F2 must be considered when determining the diameters of the first tube 21 and the second tube 22. Furthermore, the pressure changes of the first and second fluids F1 and F2 are more sensitive when the diameters of the first and second tubes 21 and 22 are smaller, providing a better micro flow control effect.

Figure 5:
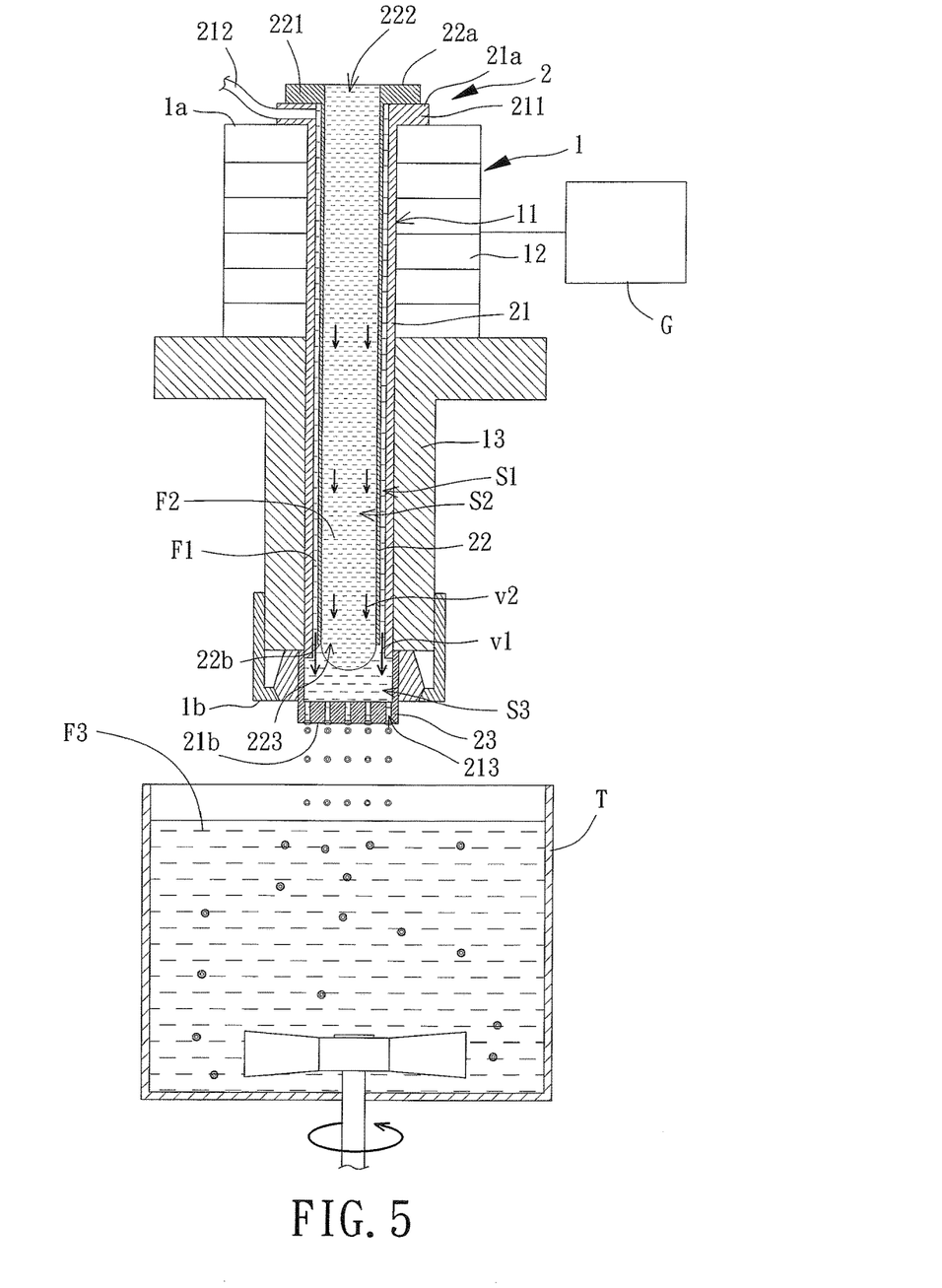
Figure 6:
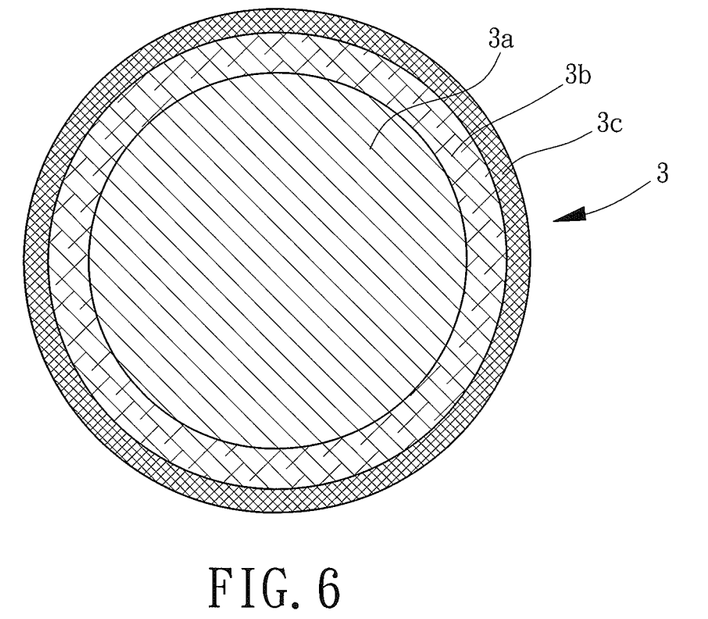
FIG. 6 is a diagrammatic view of a semi-product of a microparticle produced by the nozzle of FIG. 2.
Figure 7:
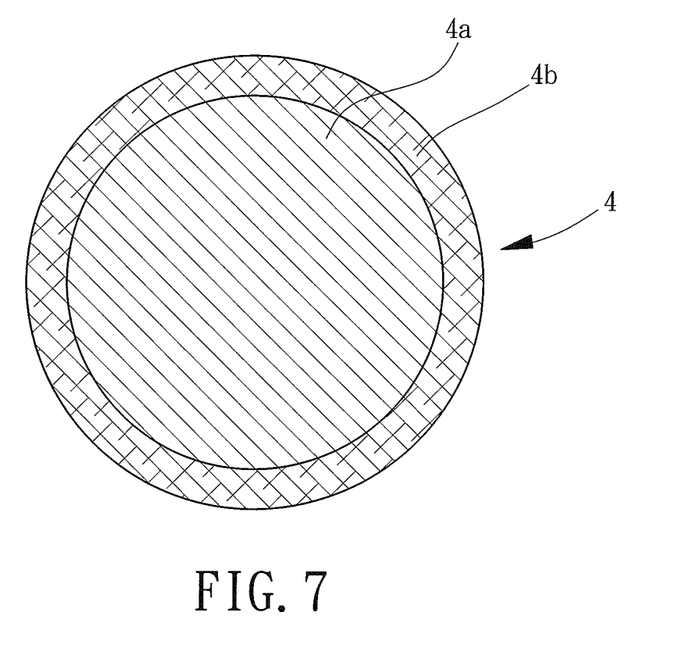
FIG. 7 is a diagrammatic view of a microparticle product produced from the semi-product of FIG. 6.

With reference to FIG. 5, in practical use of the nozzle for producing microparticles according to the present disclosure, a worker fills a third fluid F3 into a tank T, the tube assembly 2 is mounted in the through-hole 11 of the nozzle body 1, and the first outlet ports 213 of the first tube 21 face the tank T, thereby completing installation of the nozzle.

Then, the worker fills the second fluid F2 into the second fluid passageway S2 via the second filling port 222 at the second speed v2, and the second fluid F2 forms a liquid film on the second outlet port 223. Furthermore, the worker fills the first fluid F1 into the first fluid passageway S1 via the first filling port 212 at the first speed v1 greater than the second speed v2. A shear force is generated by the difference between the first speed v1 and the second speed v2. Thus, the first fluid F1 in the formation space S3 envelopes and shears the single-layer liquid film formed by the second fluid F2 on the second outlet port 223. Furthermore, dual-layer liquid films are formed on the first outlet ports 213 by surface tension.

Next, the worker activates the supersonic wave generator G, and the high frequency electric energy generated by the supersonic wave generator G is transmitted to the piezoelectric portion 12 and is turned into vibrational energy by the piezoelectric portion 12. Furthermore, by providing the amplifying portion 13 connected to the piezoelectric portion 12, the dual-layer liquid film formed on each first outlet port 213 absorbs the vibrational energy and forms a standing wave. When the vibrational energy absorbed by the dual-layer liquid film on each first outlet port 213 exceeds the surface tension of the dual-layer liquid film, a plurality of dual-layer droplets of a uniform size is sprayed directionally outward from the first outlet ports 213 and falls into the tank T.

The diameter $d_p$ of the microdroplet can be expressed by the equation presented by Robert J. Lang in 1962.

$$d_p=0.34\cdot\lambda$$

$$\lambda=((8\cdot\pi\cdot\theta)/(\rho\cdot f^2))^{1/3}$$

wherein λ is the wavelength of the standing wave, θ is the surface tension of the fluid, ρ is the density of the fluid, and f is the vibrational frequency. As can be seen from the above equation, a smaller diameter of the microdroplet can be obtained by simply increasing the vibrational frequency.

At this time, the third fluid F3 in the tank T envelops the outer layer of each dual-layer microdroplet (namely, emulsification) to form a semi-product 3 of a microparticle (see FIG. 6) in the tank T. The semi-product 3 includes an inner layer 3*a* formed by the second fluid F2, a middle layer 3*b* formed by the first fluid F1, and an outer layer 3*c* formed by the third fluid F3.

Next, the worker collects the semi-products 3 in the tank T. The semi-products 3 can be dried by hot air to evaporate the outer layer 3*c* formed by the third fluid F3, forming microparticle products 4 each of which merely includes the inner layer 4*a* formed by the second fluid F2 and the outer layer 4*b* formed by the first fluid F1 (see FIG. 7).

Based on the same technical concept, a worker can use a tube assembly 2 including a third tube (not shown) received in the second tube 22 to produce multi-layer microparticles having more than two layers, which can be appreciated by a person having ordinary skill in the art without redundant description.

In view of the foregoing, the nozzle for producing microparticles according to the present disclosure utilizes the tube assembly 2 having the first tube 21 and the second tube 22 to form a dual-layer liquid film on each first outlet port 213 and utilizes the vibrational energy generated by the combined action of the piezoelectric portion 12 and the amplifying portion 13 to reduce the thickness of the dual-layer liquid film on each first outlet port 213, thereby forming dual-layer microdroplets that fall into the tank T. Thus, the present disclosure achieves the effect of mass production of microparticles of a uniform size and can be applied in mass production of microparticles in various situations, such as manufacture of microparticles used as microcarriers or application in the field of microparticle spray.

Thus since the present disclosure disclosed herein may be embodied in other specific forms without departing from the spirit or general characteristics thereof, some of which forms have been indicated, the embodiments described herein are to be considered in all respects illustrative and not restrictive. The scope of the present disclosure is to be indicated by the appended claims, rather than by the foregoing description, and all changes which come within the meaning and range of equivalency of the claims are intended to be embraced therein.

What is claimed is:

1. A nozzle for producing microparticles, comprising:

a nozzle body including a first end and a second end opposite to the first end, with the nozzle body further including a through-hole, an oscillating device, and an amplifying portion, with the oscillating device connected to the amplifying portion, with the amplifying portion located between the first end and the second end, with the through-hole extending from the first end of the nozzle body through the amplifying portion and extending through the second end of the nozzle body; and a tube assembly mounted in the through-hole, with the tube assembly including a first tube and a second tube surrounded by the first tube, with a first fluid passageway defined between the first tube and the second tube, with a second fluid passageway defined in the second tube and surrounded by the first fluid passageway, with the first fluid passageway and the second fluid passageway configured to respectively permit two fluids to flow from the first end toward the second end of the nozzle body, with the first tube including a first end forming a first filling port intercommunicated with the first fluid passageway and a second end forming a plurality of first outlet ports intercommunicated with the first fluid passageway, with the second tube including a first end forming a second filling port intercommunicated with the second fluid passageway and a second end forming a second outlet port intercommunicated with the second fluid passageway, with the second end of the second tube being located intermediate the first and second ends of the first tube, with a formation space defined between the second outlet port and the plurality of first outlet ports, with the formation space intercommunicating with the first and second fluid passageways and located intermediate the second outlet port and the plurality of first outlet ports, and with the first tube including a end formed by a sleeve having the plurality of first outlet ports.

2. The nozzle for producing microparticles as claimed in claim 1, with each of the plurality of first outlet ports having a diameter, with two adjacent first outlet ports having a wall spacing therebetween, and with the wall spacing being at least two times the diameter.

3. The nozzle for producing microparticles as claimed in claim 1, wherein the oscillating device includes a piezoelectric portion.

4. The nozzle for producing microparticles as claimed in claim 3, wherein the through-hole extends from the first end of the nozzle body through the piezoelectric portion and the amplifying portion in sequence and extends through the second end of the nozzle body.

5. The nozzle for producing microparticles as claimed in claim 1, wherein an outer diameter of the tube assembly matches an inner diameter of the sleeve.

* * * * *